June 4, 1968     P. D. NORCROSS     3,386,289
LIQUID TESTER
Filed June 16, 1964
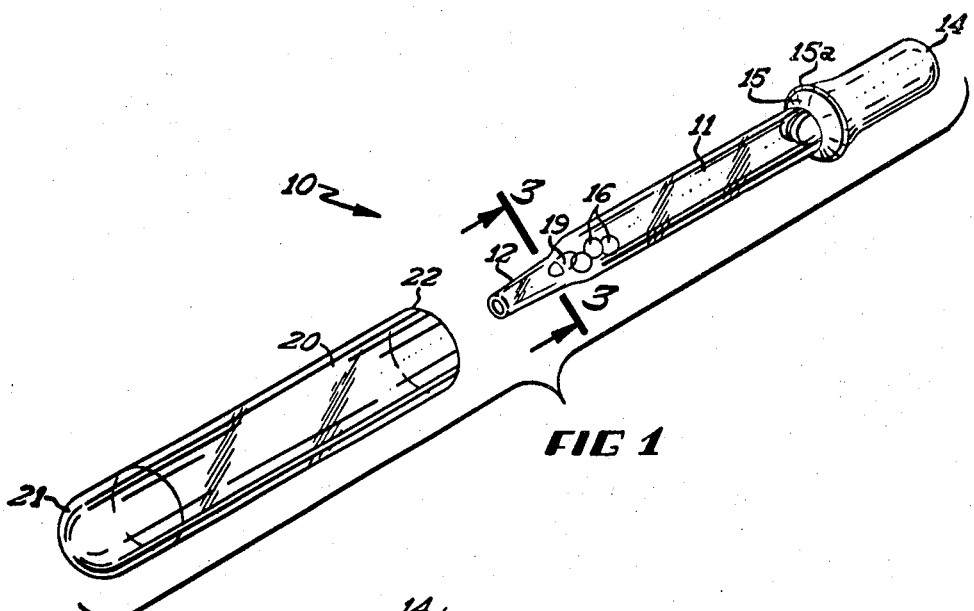
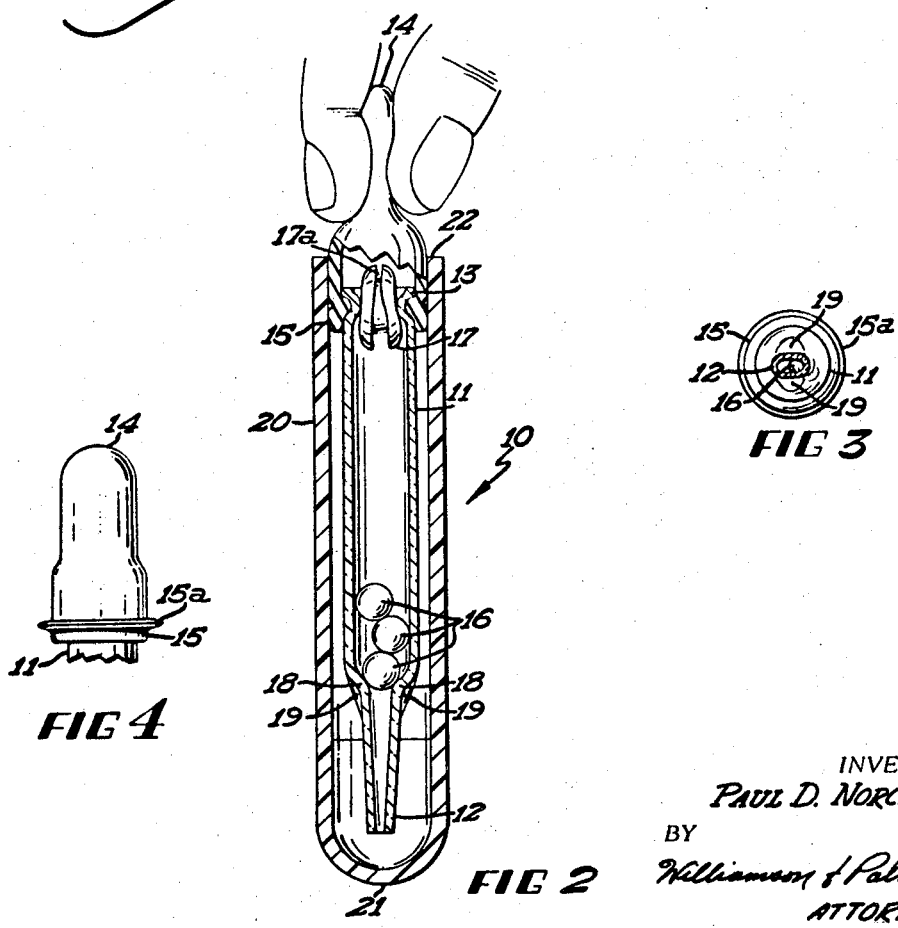
INVENTOR.
PAUL D. NORCROSS
BY
*Williamson & Palmatier*
ATTORNEYS 3,386,289
LIQUID TESTER
Paul D. Norcross, 1811 W. Warner Ave.,
Chicago, Ill. 60613
Continuation-in-part of application Ser. No. 217,417,
Aug. 16, 1962. This application June 16, 1964, Ser.
No. 375,554
1 Claim. (Cl. 73—440)

This invention relates to a portable, pocket sized apparatus for testing the specific gravity of a liquid, such as testing the alcoholic content of a cocktail or the nature of the acid in a battery.

This application constitutes a continuation in part of applicant's prior co-pending application filed Aug. 16, 1962, S.N. 217,417 and entitled "Pocket Sized Battery Tester", now abandoned.

Apparatus for testing specific gravity of liquids have been heretofore known and have primarily been used in connection with testing of battery acid, testing the antifreeze in engine radiators, and the like. Such prior testers have had many distinct disadvantages, and one of the primary disadvantages of previous testers has been the delicacy of such apparatus and the propensity of certain parts thereof to be broken. It will be understood that the stem portion of a battery tester and of most radiator coolent testing devices are constructed of glass, and in the base of battery testing devices, the stem portion is necessarily constructed of glass so as to be acid resisting. The stems of such devices are transparent in order to permit the mechanic to see through the stem and see the actual liquid in the tester and the sensing and indicating apparatus therein for indicating the specific gravity of the liquid being tested.

The foregoing also applies to devices of this type utilized to sense and indicate the alcoholic content of a beverage or cocktail.

In connection with all of such devices, there has been a problem in connection with the storing of these apparatus or devices between uses thereof. Because of the glass nature of the stem, the devices are subject to breakage and particularly where the device is stored in a tool box, or in a tool drawer or maybe carried in a pocket of a person's clothing.

An object of the invention is to provide a new and improved apparatus of simple and inexpensive construction and operation for testing the specific gravity of a liquid.

Another object of the invention is to provide a new and novel apparatus for testing the specific gravity of a liquid and which may be readily and easily carried in a tool box or tool drawer or maybe carried in one's pocket without fear that the apparatus will be broken or will spill the liquid being tested or having been tested into the tool kit or pocket.

These and other objects and advantages of my invention will more fully appear from the following description made in connection with the accompanying drawings, wherein like reference characters refer to the same or similar parts throughout the several views, and in which:

FIG. 1 is a perspective view of the testing device in exploded condition.

FIG. 2 is a longitudinal section view of the apparatus shown assembled in condition for convenient and proper storage.

FIG. 3 is a detail cross section view taken approximately at 3—3 in FIG. 1.

FIG. 4 is a detail elevation view showing a portion of the bulb and tube disassembled from the cap.

One form of the invention is shown in the drawings and is described herein. The apparatus or device for testing the specific gravity of a liquid is indicated in general by numeral 10 and includes an elongate glass tube 11 having a reduced lower or forward end 12 and a slightly flared upper or rear end 13 upon which is applied a rubber bulb 14 which has a resiliently compressible open front end 15 which encompasses the rear end 13 of the tube 11 and extends forwardly there along. The open end 15 of the bulb engages the tube 11 in sealed relation so that the interior of the bulb 14 and the interior of tube 11 are in fluid communicating relation with each other. It will be noted particularly in FIG. 4, that the bulb 14 has an outwardly protruding and flexible flange or bead 15a formed integrally thereof.

The tube 11 has a plurality of small plastic balls 16 therein which have specific gravities which vary slightly in relation to each other and of a magnitude in relation to the nature of the liquid to be tested. For instance, if the device 10 is to be used in connection with the sensing and indicating the alcoholic content of a cocktail, such as a martini, the balls 16 will have specific gravities in a certain range; and if the device 10 is to be used for testing battery fluid of a wet cell battery, the balls 16 will have a specific gravity in a different range. The balls 16 are also variously colored so that their presence and location can be readily determined. The specific gravities of the balls 16 vary slightly with respect to each other such that, in the case of an alcoholic beverage tester, if all of the balls float this will indicate that the beverage has only a minimum amount of alcohol in it (or would indicate a weak martini); if one of the balls sinks to the bottom of the liquid contained in the tube 11 and the other two balls float, then there is a normal amount of alcoholic content in the beverage (such as a regular martini); and if two of the balls sink to the bottom while only one floats, this indicates that the alcoholic content is substantially more than normal (such as in a dry martini) and if all three of the balls 16 sink to the bottom of the liquid contained in the tube 11, this is an indication that the beverage has more than a normal amount of alcoholic content in it (such as an extra dry martini).

The upper end of tube 11 has an obstruction 17 therein to prevent passage of the balls 16 upwardly into the bulb 14. In the form shown, the obstruction 17 comprises a small annular grommet with a peripheral groove or passage 17a of sufficient size as to readily permit passage of air and liquid therethrough so as to maintain the interior or bulb 14 and tube 11 in the fluid communication with each other.

The tube 11 also has an obstruction 18 formed at the upper end of the reduced lower end 12 and the obstruction 18 is formed by producing a pair of dimples 19 in opposite sides of the tube so that the lower most ball in the tube 11 will be supported only at two spaced points on its periphery and so that liquid or air may freely pass by the lowest ball and communicate between the lower and intermediate portions of tube 11.

The device 10 also includes an elongate cap 20 having a closed lower end 21 and an open upper end 22 in which the tube 11 and the open end 15 of bulb 14 is receivable. It will be noted in FIG. 2 that the tube 11 is centered within the elongate cap 20 by the open end of the bulb 15 which surrounds the portion 13 of tube 11. It will further be noted that the open portion 15 of the bulb 14 is resiliently compressed as it is inserted into the open end 22 of the cap 20, and the bead or flange 15a is compressibly and resiliently deformed so as to seal against the interior periphery of the cap 22.

The cap 20 is formed of any stiff and impact resistant material, and one example of such material is a heavy grade and relatively stiff grade of polyethylene plastic material. The material of the cap 20 must necessarily resist the action of any liquid that the device is designed to test, and in the event that the device is designed to test and indicate the specific gravity of a battery acid, the ball 16, will of course be of such a nature as to indicate whether the acid has the proper strength or not, depending on which of the balls is caused to float when the acid is tested. Likewise the material of cap 20 must be resistant to the acid material so that it will not be eaten away or otherwise damaged by the liquid.

When the bulb 14 is inserted into the cap 20, there is a compression of the open peripheral end portion 15 of the cap and a substantially simultaneous deformation of the bead or flange 15a so that a sealing relationship is created between the peripheral portion of the bulb 14 and the open end 22 of the cap 20. It will be understood that as the bulb 14 is manually gripped, it is ordinarily compressed by the fingers so as to expel a good deal of the air from the bulb 20, which of course causes air to be expelled from the tube 11 and from cap 20 just prior to engagement by the periphery 15 of the bulb with the open end 22 of the cap 20. As the end 15 of the bulb 14 engages the open end of the cap, there is a wiping of the liquid downwardly along the interior periphery of the cap wall so that any liquid that might be present on the interior periphery of cap 20 adjacent its open end 22 is wiped downwardly into the cap and is thereby prevented from dripping off so as to allow liquid to engage the person's pocket or tool box wherein the device may be kept. It will also be understood that after the bulb is sealed to the cap when inserted, the releasing of the fingers from the bulb 14 allows the bulb 14 to expand and therefore a partial vacuum is created within the tube 11 and cap 20 so as to minimize any possibility of additional liquid being allowed to escape from the cap after the tube and bulb are assembled therewith.

It will, of course, be understood that various changes may be made in the form, detail, arrangement and proportion of the parts without departing from the scope of my invention which consists of the matter described herein and set forth in the appended claims.

1. A portable, pocket-size apparatus for testing specific gravity of a liquid, comprising an elongate tube constructed of rigid, transparent and fracturable material of the nature of glass, said tube having open forward and rear ends permissive of fluid communications therethrough, said tube being sharply reduced in cross-sectional size adjacent said forward end to produce an obstruction at the tube interior permissive of fluid communication therethrough, said tube having an oblong cross-sectional configuration at said obstruction, a resiliently flexible bulb having a generally straight sided open end encompassing and gripping the rear end of the tube in fluid-sealing relation, said straight sided open end of the bulb having an outwardly protruding annular and resiliently compressible bead formed therearound and being disposed transversely outwardly of the rear end of the tube, said bulb being adapted for manual manipulation to effect drawing of liquid and air into the tube and expulsion of the liquid and air therefrom, a plurality of balls in the tube of varying specific gravities whereby to float and sink in liquids of different specific gravities when the liquid is drawn into the tube, said balls having a diameter substantially less than the interior size of the tube, and having a diameter substantially greater than the size of the tube across the width of the oblong across section at said obstruction, said balls also having a diameter considerably in excess of one-half the internal size of said tube and thereby prevent said balls from passing by one another within the tube and whereby the ball immediately adjacent said obstruction will engage the tube at the oblong cross section at only two points to prevent jamming of the balls into a fixed position, and an elongate cap constructed of stiff, impact-resisting material and having a closed end and an open end, the said cap having a tubular sidewall between said open and closed ends with an interior size to receive the tube in loose fitting relation, the open end of said cap having a cross-sectional size and configuration at least as large as said tubular wall and receiving the straight sided inner end of the bulb and the compressible bead therein in liquid sealing relation, said bead and the open end of the cap maintaining the fracturable tube substantially centered within the cap and in closely spaced relation therewith, said tube and bulb being removable from said cap for testing liquids and returnable into said cap to protect the tube against breakage and to confine the drippings of the liquid within the cap inwardly wiping of the bead on the bulb periphery inwardly along the cap and in liquid sealing and frictional relation therewith while the bulb is dipped and squeezed to effect expulsion of all the liquid from the tube and create a fluid pressure of less than atmospheric within the tube and bulb to prevent outward migration of any liquid in the cap.

References Cited
UNITED STATES PATENTS

| | | | |
|---|---|---|---|
| 694,530 | 3/1902 | Comer | 128—233 |
| 766,204 | 8/1904 | Walsh | 128—233 |
| 1,697,353 | 1/1929 | Garrison | 73—440 XR |

FOREIGN PATENTS 299,816  10/1928  Great Britain.

LOUIS R. PRINCE, *Primary Examiner.*

DAVID SCHONBERG, *Examiner.*

D. O. WOODIEL, *Assistant Examiner.*